United States Patent [19]

de Almeida Thompson et al.

[11] Patent Number: 5,020,695

[45] Date of Patent: Jun. 4, 1991

[54] APPARATUS FOR CONTROLLING THE DISCHARGE OF MATERIAL FROM A STORAGE TANK

[75] Inventors: Eduardo C. de Almeida Thompson; Joao P. Taveira, both of San Paulo, Brazil

[73] Assignee: California Pellet Mill Company, San Francisco, Calif.

[21] Appl. No.: 448,293

[22] Filed: Dec. 11, 1989

[30] Foreign Application Priority Data

Jun. 26, 1989 [BR] Brazil ........................... 8903115

[51] Int. Cl.⁵ ............................................ B65D 83/06
[52] U.S. Cl. ................................. 222/185; 222/275; 34/65
[58] Field of Search ............... 222/342, 275, 270, 265, 222/409, 333, 195, 200, 564, 185; 34/64, 65, 66

[56] References Cited

U.S. PATENT DOCUMENTS

| | | | |
|---|---|---|---|
| 2,432,852 | 12/1947 | Arvidson | 222/409 |
| 2,788,922 | 4/1957 | Gmür | 222/270 |
| 4,683,665 | 8/1987 | Geelen | 34/65 |

*Primary Examiner*—Michael S. Huppert
*Assistant Examiner*—A. Pomrening
*Attorney, Agent, or Firm*—Robert F. Palermo

[57] ABSTRACT

An apparatus is offered for controlling the discharge of granular or pelletized material from a tank, consisting of a movable grate (35) between two perforated stationary grates (27, 31), the openings (30, 34) of which are not in alignment. A plurality of scrapers (36) driven back and forth in essentially opposite directions scrapes off the material that has passed through the openings (30) of the first grate (27) and accumulated on the second grate (31) for its controlled discharge while permitting the complete emptying of the tank for easy and rapid cleaning.

12 Claims, 3 Drawing Sheets

APPARATUS FOR CONTROLLING THE DISCHARGE OF MATERIAL FROM A STORAGE TANK

BACKGROUND OF THE INVENTION

1. Scope of the Invention

The present invention pertains to an apparatus for controlling the discharge of granular or pelletized materials from a storage tank and, more specifically, to a control device of this type especially designed to ensure the continuous and uniform discharge of pelletized materials from a cooler for pellets.

2. Prior Art

The controlled discharge of granular or pelletized materials from a storage tank is an urgent problem in practically all storage systems currently known, and it is of particular importance with respect to pelletized materials.

Processes for the treatment or beneficiation of powdered and/or particulate materials by compaction and extrusion, commonly called pelletization, are widely known and utilized in the state of the art to facilitate handling and to reduce the storage, packaging, and transport costs of these materials, in addition to providing for their greater durability.

In a typical pelletizing machine, the powdered and/or fine-particulate material to be pelletized is fed continuously into a compaction chamber with an extrusion die at one end.

A feed arrangement in the compaction chamber distributes the material uniformly on steel rollers working together with the internal surface of the die, the conjoined rotation of which strongly compresses the material and thus forces it through the die orifices.

A cutting device, containing a plurality of knife blades, is located adjacent to the outer surface of the die at a distance that can be adjusted for cutting the material thus compacted into the desired lengths immediately after its extrusion so as to form pellets of the desired dimensions.

The compaction, compression, and extrusion of the material obviously cause a substantial increase in temperature; therefore, the pellets must be cooled in some way.

Various pellet coolers based on various cooling systems have been tested, and experience has revealed that the best results are obtained with coolers of the counterflow type.

In these coolers, the pelletized material to be cooled is fed in the descending direction into a heat-exchange chamber, while a stream of cooling air is blown in the opposite direction, i.e., upward.

Although these counterflow coolers provide satisfactory cooling of the pellets, they still present some problems, primarily with respect to the discharge or escape of the cooled material.

In fact, certain parameters and characteristics must be satisfied by such coolers. The following requirements can be mentioned: the uniform cooling of all the material; the facility for emptying completely for cleaning; the continuous and uniform discharge of the pellets; and, basically, a discharge mechanism that does not compromise the integrity of the pelletized material.

The problem of uniform cooling is readily solved by providing a cooling chamber with a circular cross section and with means that ensure the adequate distribution of the ascending stream of cooling air.

The other problems are not so easy to solve, however, and none of the commercially available pellet coolers is capable of satisfactorily solving the three problems simultaneously.

A pellet cooler available from Machinefabriek A. Wijnveen B. V. is supplied with a discharge device consisting of a pair of stationary gratings equipped with annular channels and a movable grate with a number of interconnected rings which move eccentrically to open and close the apertures of the stationary grates.

This discharge arrangement, due to the eccentric movement of the rings, does not provide for the uniform discharge of the pellets, nor does it protect their integrity, since they can be crushed between the apertures and the rings.

Another pellet cooling design, U.S. Pat. No. 4,683,665, available from Geelen Haelen Holland B. V., is supplied with a discharge device consisting of a pair of stationary grates equipped with nonaligned openings and a mobile grate moving back and forth between them to open and close the openings and thus to discharge the pellets.

However, this discharge design does not provide for the uniform and constant discharge of pellets, and it is also difficult to clean, since a certain quantity of pellets remains caught in the mobile grate at the extreme portions of its alternating movement.

SUMMARY OF THE INVENTION

The purpose of the present invention is to solve these problems of the prior art by offering a device for controlling the discharge of granular or pelletized materials from a storage tank, which provides for the continuous and uniform discharge of the material without compromising its integrity.

Another purpose of the present invention is to provide such a device for controlling the discharge of granular or pelletized materials from a storage tank, which makes it possible to empty the tank easily and quickly for cleaning.

An additional goal of the present invention is to provide a device for controlling the discharge of granular or pelletized materials from a cooling apparatus for these materials, which facilitates the uniform cooling of all the material by ensuring the adequate distribution of the stream of cooling air.

In accordance with the present invention, these goals are achieved by a device for controlling the discharge of a material from a storage tank, which is characterized in that it consists of an initial stationary grate arrangement with a plurality of openings for the material; a second stationary grate arrangement located below the first grate setup, which also has a plurality of passages for the material; the apertures of the second grate arrangement being offset in relation to the passages of the first grate arrangement; a movable grate arrangement between the first and second stationary grate arrangements, this grate being provided with a first set of scrapers moved back and forth by a first actuator element and with a second set of scrapers moved back and forth by a second actuator element, the first and second actuators being connected to a power unit and being actuated in such a way that the alternating movements of the first and second sets of scrapers are in essentially opposite directions.

BRIEF DESCRIPTION OF THE DRAWINGS

The present invention is described in the following in greater detail on the basis of nonlimiting examples and with reference to a currently preferred embodiment, illustrated in the attached drawings.

DESCRIPTION OF THE PREFERRED EMBODIMENT

Figure 1:
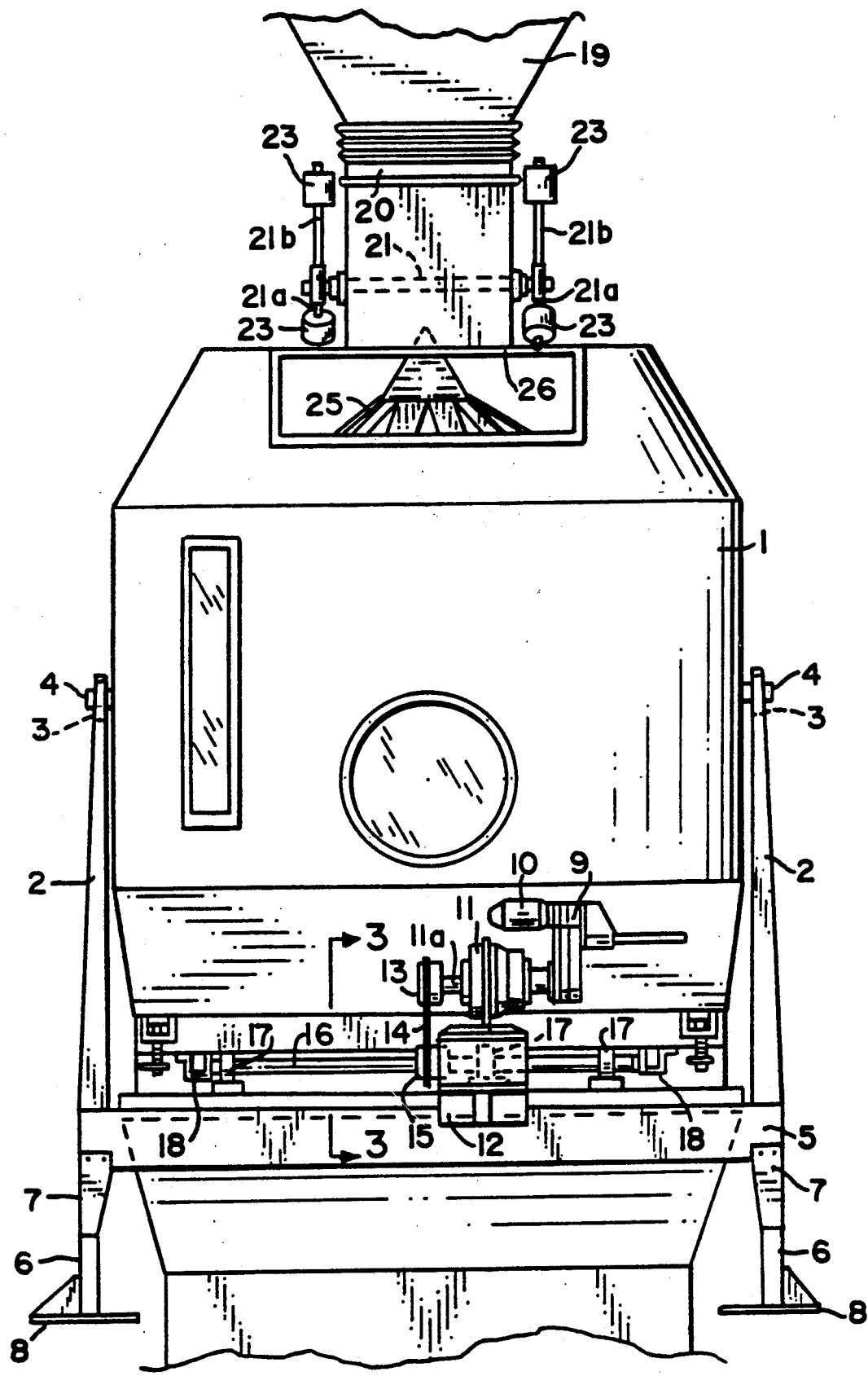
FIG. 1 is a front view of a pellet cooler of the counterflow type with a discharge arrangement in accordance with the present invention.
Figure 2:
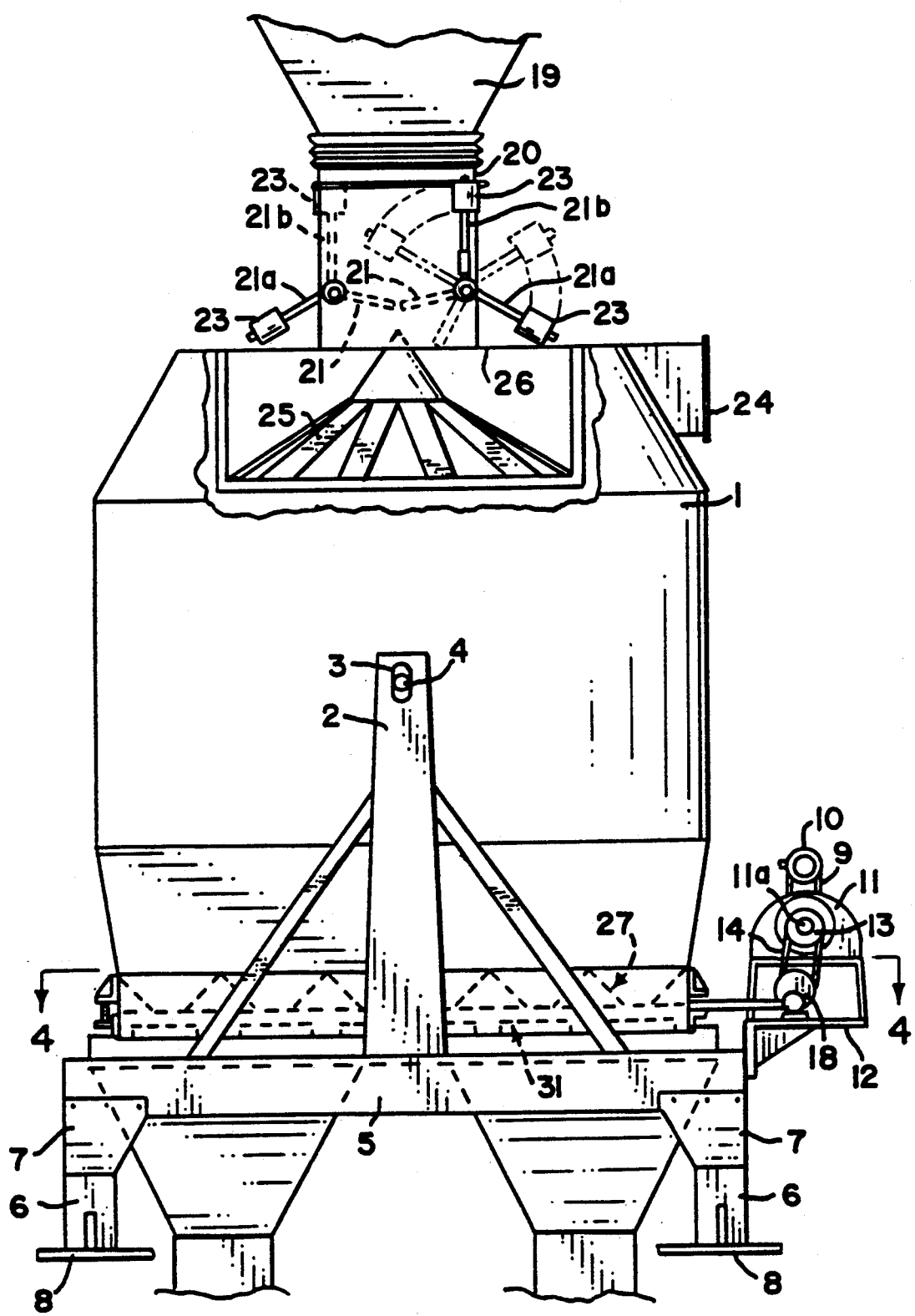
FIG. 2 is a side view of the pellet cooler of FIG. 1.

With reference in particular to the drawings, a pellet cooler of the counterflow type, incorporating a discharge apparatus in accordance with the present invention, is shown in FIGS. 1 and 2.

A tank 1, with an essentially circular cross section, inside of which the pellets are cooled, is supported by two columns 2, provided with keyways 3 in their upper ends to receive pegs 4, which project radially from tank 1.

Support columns 2 project vertically upward from the opposite sides of an essentially square support structure 5, which rests on legs 6 at the corners. An iron bracket 7 is used to reinforce the attachment of each leg 6 to support structure 5, and another bracket 8 at the lower end of each leg 6 serves to distribute the weight of the cooler and to allow the cooler to be fastened to the floor.

A variable motor-reducer unit 9, of the type involving two V-pulleys (not shown) is connected to the drive shaft of an electric motor 10 to transmit torque from the motor to a transmission 11. This drive assembly is mounted on a support flange 12, which projects laterally from support structure 5.

A drive pulley 13 is mounted on output shaft 11A of transmission 11 and is connected via a drive belt 14 to a driven pulley 15, mounted on a shaft 16. Shaft 16, parallel to one of the sides of support structure 5, rotates in bearings 17 and has a crank 18 at each end, the purpose of which will be described further below.

The pellets are fed to tank 1 through a hopper 19 with a neck section 20 with a system of valves 21. Each valve 21 consists of a pair of lever arms 21A, 21B, mounted at an angle to each other: these arms pivot around a point 22 in neck section 20. Each external lever arm 21B has counterweight 23 at its outer end.

The feed system via valves 21 meters the pellets being loaded into the tank 1 in a controlled manner and also serves to prevent the escape of the ascending stream of cooling air in the tank through feed hopper 19, so that this air stream is directed toward its natural exit 24, in the side of the tank.

A distribution cone 25 is provided immediately below opening 26 of neck section 20 inside the tank 1 to ensure the uniform distribution of the pellets over the entire circular cross section of the tank. This distribution, in combination with the circular format of the tank, results in the uniform cooling of the pellets.

Figure 3:
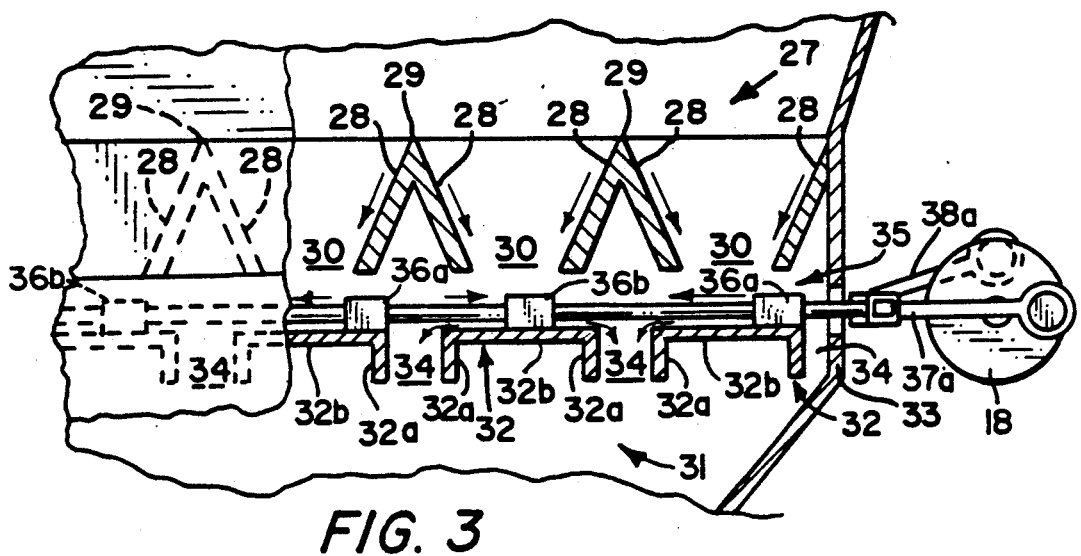
FIG. 3 is an elevation view, on an enlarged scale, of a portion of the discharge device of the present invention.
Figure 4:
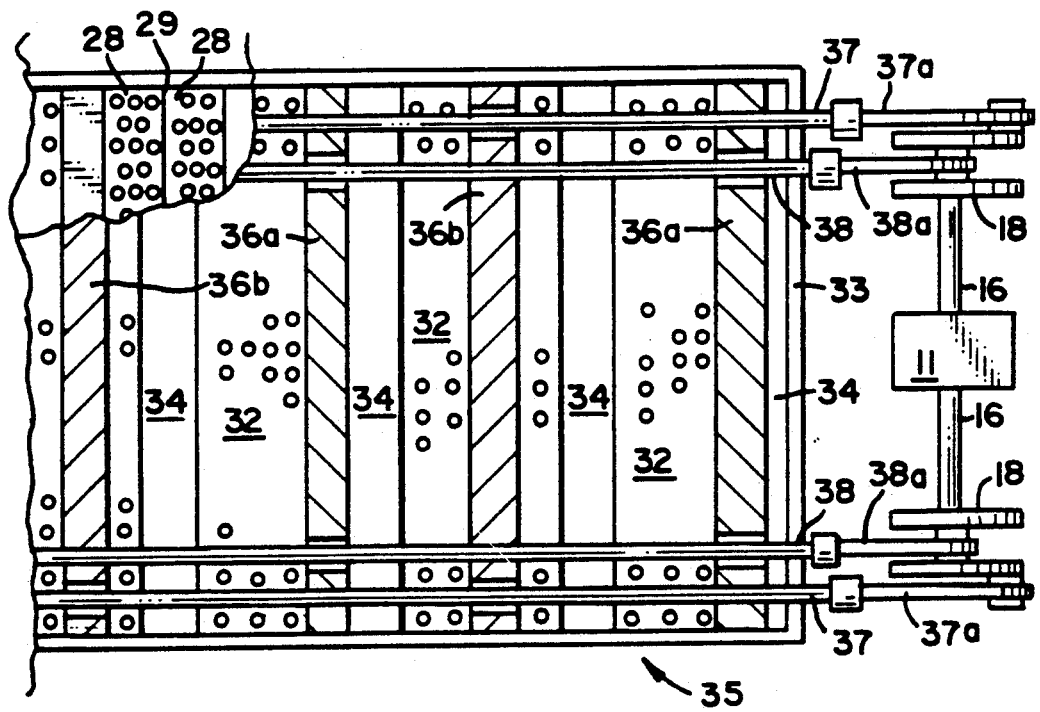
FIG. 4 is an upper plan view of a detail of the discharge device shown in FIG. 3.

The device for controlling the discharge of pellets from the cooler is illustrated in greater detail in FIGS. 3 and 4.

A first, upper grate 27 is installed underneath tank 1. Grate 27 consists of a plurality of plates 28, the arrangement of which defines conical ridges 29, which direct the pellets into the openings 30 between ridges. Metal plates 28 forming ridges 29 are preferably perforated to permit the free passage of the ascending stream of cooling air.

A second, lower grate 31 is positioned below grate 27. Lower grate 31 consists of a plurality of metal plates 32 with a U-shaped profile; legs 32A of the U are folded in a downward direction and are joined at the top by flat sections 32B. Metal plates 32 are parallel to each other and are spaced apart from each other and from the side wall 33 of the discharge device so as to provide openings 34 for the pellets.

Openings 34 in lower grate 31 are offset in relation to openings 30 in upper grate 27, so that the pellets passing through the upper grate accumulate on flat sections 32B of metal plates 32 of the lower grate.

A movable grate 35, located between upper grate 27 and lower grate 31, both stationary, is used to control the discharge of the pellets from the cooler.

Movable grate 35 consists of a plurality of parallel scrapers 36, divided into a first set of scrapers 36A, permanently connected to a first drive element 37, consisting of two parallel rods projecting beyond support structure 3, and a second set of scrapers 36B, permanently connected to a second drive element 38, consisting of two parallel rods, also projecting beyond support structure 3.

Projecting ends 37A, 38A of drive elements 37, 38 are connected to cranks 18 at the ends of shaft 16. By virtue of this connection, the rotation of shaft 16 imparts an alternating or reciprocating movement to the two sets of scrapers 36A, 36B.

The alternating movement of the sets of scrapers 36A, 36B moves the pellets which have accumulated on flat portions 32B of lower grate 31 toward openings 34 of this grate, thus controlling the discharge of the pellets.

To prevent the accumulation of residue and to facilitate the complete emptying of the cooler, the connection of projecting ends 37A, 38A of drive elements 37, 38 to the cranks is effected at different angular positions, by which means the alternating movements of the sets of scrapers 36A, 36B occur in opposite directions.

The speed of these alternating movements can be increased or decreased by controlling the current supplied to electric motor 10 or by varying the transmission ratio of motor-reducer unit 9. This offers an additional way of controlling the discharge of the pellets.

An apparatus for controlling the discharge of granular or pelletized materials from a storage tank is thus provided which permits the precise control of the discharge rate in a continuous and uniform manner without compromising their integrity, and which permits the complete emptying of the tank for cleaning without the need to disassemble the apparatus.

The invention as described can undergo innumerable variations and modifications in its implementation, provided that these modifications do not deviate from the spirit and scope of the invention as defined in the following claims.

We claim:

1. Apparatus for controlling the discharge of a material from a storage tank, comprising:
   (a) a first stationary grate (27) comprising a plurality of perforated plates (28) which define symmetrical ridges (29) for directing the material toward a number of openings (30) for the material;
(b) a second stationary grate (31), located below the first grate (27), with a number of openings (34) for the material, the openings (34) of the second grate (31) being offset in relation to the openings (30) of the first grate (27);
(c) a movable grate (35), located between the first stationary grate (27) and the second stationary grate (31), comprising a first set of scrapers (36A) driven back and forth by a first drive element (37) and a second set of scrapers (36B) driven back and forth by a second drive element (38); and
(d) the connection of the first and second drive elements (37, 38) by their projecting ends (37A, 38A) to cranks (18) on a shaft (16) at a certain angle to each other, by which means the first and second sets of scrapers (36A, 36B) are moved back and forth in essentially opposite directions.

2. Apparatus for controlling the discharge of a material from a storage tank, comprising:
(a) a first stationary grate (27) with a number of openings (30) for the material;
(b) a second stationary grate (31), which comprises a plurality of perforated parallel plates (32) having inverted U-shaped profiles with their legs (32A) joined by a flat section (32B) positioned so as to provide openings (34) between adjacent plates and between the end plates and the wall (33) of the apparatus for the material, located below the first grate (27), the opening (34) of the second grate (31) being offset in relation to the openings (30) of the first grate (27);
(c) a movable grate (35), located between the first stationary grate (27) and the second stationary grate (31), comprising a first set of scrapers (36A) driven back and forth by a first drive element (37) and a second set of scrapers (36B) driven back and forth by a second drive element (38); and
(d) the connection of the first and second drive elements (37, 38) by their projecting ends (37A, 38A) to cranks (18) on a shaft (16) at a certain angle to each other, by which means the first and second sets of scrapers (36A, 36B) are moved back and forth in essentially opposite directions.

3. Apparatus according to claim 2, wherein the first set of scrapers (36A) comprises a plurality of parallel elements (36) of length equal to that of said U-shaped plates (32) capable of sliding on the flat surfaces (32B) of the plates (32) of the grate (31).

4. Apparatus according to claim 2, wherein the said second set of scrapers (36B) comprises a plurality of parallel scrapers (36) of length equal to that of said U-shaped plates (32) capable of sliding on the flat surfaces (32B) of the plates (32) of the second grate (31).

5. Apparatus according to claim 2, wherein the first and second drive elements (37, 38) each comprises a pair of parallel rods connected to each scraper (36) of its driven set of scrapers (36A, 36).

6. Apparatus according to claim 5, wherein each rod (37, 38) has a projecting end (37A, 38A) driven by a crank (18) of a motor shaft (16) to impart an alternating movement to the first and second sets of scrapers (36A, 36B).

7. Apparatus for controlling the discharge of a material from a storage tank, especially suitable for use in a pellet cooler, comprising:
(a) a first grate (27) comprising a plurality of perforated plates (28) which define symmetrical ridges (29) for directing the material toward a plurality of openings (30) underneath the cooler;
(b) a second grate (31) underneath the first grate (27), with a plurality of openings (34) offset with respect to the openings (30) of the first grate (27); and
(c) a movable grate (35) between the first and second grates (27, 31), with a plurality of scrapers (36) driven back and forth in essentially opposite directions on the second grate (31) to scrape the pellets accumulated on the second grate (31) toward its openings (34).

8. Apparatus for controlling the discharge of a material from a storage tank, comprising:
(a) a first stationary grate (27) comprising a plurality of perforated plates (28) which define symmetrical ridges (29) for directing the material toward a number of openings (30) for the material;
(b) a second stationary grate (31), which comprises a plurality of perforated parallel plates (32) having inverted U-shaped profiles with their legs (32A) joined by a flat section (32B) positioned so as to provide openings (34) between adjacent plates and between the end plates and the wall (33) of the apparatus located below the first grate (27), the openings (34) of the second grate (31) being offset in relation to the openings (30) of the first grate (27);
(c) a movable grate (35), located between the first stationary grate (27) and the second stationary grate (31), comprising a first set of scrapers (36A) driven back and forth by a first drive element (37) and a second set of scrapers (36B) driven back and forth by a second drive element (38); and
(d) the connection of the first and second drive elements (37, 38) by their projecting ends (37A, 38A) to cranks (18) on a shaft (16) at a certain angle to each other, by which means the first and second sets of scrapers (36A, 36B) are moved back and forth in essentially opposite directions.

9. Apparatus according to claim 8, wherein the first set of scrapers (36A) comprises a plurality of parallel elements (36) of length equal to that of said U-shaped plates (32) capable of sliding on the flat surfaces (32B) of the plates (32) of the grate (31).

10. Apparatus according to claim 8, wherein the said second set of scrapers (36B) comprises a plurality of parallel scrapers (36) of length equal to that of said U-shaped plates (32) capable of sliding on the flat surfaces (32B) of the plates (32) of the second grate (31).

11. Apparatus according to claim 8, wherein the first and second drive elements (37, 38) each comprise a pair of parallel rods connected to each scraper (36) of its driven set of scrapers (36A, 36B).

12. Apparatus according to claim 11, wherein each rod (37, 38) has a projecting end (37A, 38A) driven by a crank (18) of a motor shaft (16) to impart an alternating movement of to the first and second sets of scrapers (36A, 36B).

* * * * *